US011980921B1

(12) United States Patent
Keller

(10) Patent No.: US 11,980,921 B1
(45) Date of Patent: May 14, 2024

(54) METHOD FOR REMOVING NAPL CONTAMINANTS FROM GEOLOGIC FORMATIONS

(71) Applicant: Carl E. Keller, Santa Fe, NM (US)

(72) Inventor: Carl E. Keller, Santa Fe, NM (US)

( * ) Notice: Subject to any disclaimer, the term of this patent is extended or adjusted under 35 U.S.C. 154(b) by 141 days.

(21) Appl. No.: 17/686,773

(22) Filed: Mar. 4, 2022

Related U.S. Application Data

(60) Provisional application No. 63/156,447, filed on Mar. 4, 2021.

(51) Int. Cl.
  *B09C 1/00* (2006.01)
  *C02F 1/28* (2023.01)
  *C02F 101/36* (2006.01)
  *C02F 103/06* (2006.01)

(52) U.S. Cl.
  CPC ............. *B09C 1/002* (2013.01); *C02F 1/288* (2013.01); *C02F 2101/36* (2013.01); *C02F 2103/06* (2013.01)

(58) Field of Classification Search
  CPC ........ E21B 43/08; E21B 43/10; E21B 43/103; E21B 43/108; B09C 1/002; C02F 1/288; C02F 2101/36; C02F 2103/06
  USPC ...... 210/502.1, 500.1, 691, 690, 693, 242.4, 210/241, 680, 679, 747.7
  See application file for complete search history.

(56) References Cited

U.S. PATENT DOCUMENTS

| | | | |
|---|---|---|---|
| 4,778,553 A | 10/1988 | Wood | |
| 5,176,207 A | 1/1993 | Keller | |
| 5,246,862 A | 9/1993 | Grey et al. | |
| 5,377,754 A | 1/1995 | Keller | |
| 5,725,055 A | 3/1998 | Schirmer | |
| 5,803,666 A | 9/1998 | Keller | |
| 5,804,743 A | 9/1998 | Vroblesky et al. | |
| 5,853,049 A | 12/1998 | Keller | |
| 6,026,900 A | 2/2000 | Keller | |

(Continued)

OTHER PUBLICATIONS

Keller, C., "Improved Spatial Resolution in Vertical and Horizontal Holes . . . "; Remediation of Hazardous Waste Contaminated Soils; 1994; pp. 513-541; Macel Dekker, Inc.; USA.

(Continued)

*Primary Examiner* — Magali P Slawski
*Assistant Examiner* — Bernadette Karen McGann
(74) *Attorney, Agent, or Firm* — Rod D. Baker

(57) ABSTRACT

A method and system for removing non-aqueous phase liquids (NAPL) from geologic media below the surface of the ground, employing a flexible liner disposed down a borehole. A flexible carrier liner has an absorbent outer cover composed of a NAPL-absorbent outer layer and a NAPL-absorbent inner layer, both preferably hydrophobic. The liner with outer cover is placed down the borehole, preferably but not necessarily by eversion. Liner placement presses the absorbent outer layer against the borehole wall. NAPL in the groundwater adjacent the outer layer is absorbed into the outer layer and then wicked into the inner layer. The liner and outer cover can then be extracted from the borehole to remove from the subsurface the NAPL absorbed in the cover's absorbent layers. If portions of the liner are transparent, a down-hole camera may be deployed to monitor the degree of NAPL absorption in the absorbent inner layer.

18 Claims, 6 Drawing Sheets

(56) References Cited

U.S. PATENT DOCUMENTS

| | | | |
|---|---|---|---|
| 6,041,863 A * | 3/2000 | Lindsey | B09C 1/002 |
| | | | 405/52 |
| 6,109,828 A | 8/2000 | Keller | |
| 6,244,846 B1 | 6/2001 | Keller | |
| 6,283,209 B1 | 9/2001 | Keller | |
| 6,401,547 B1 | 6/2002 | Hatfield et al. | |
| 6,910,374 B2 | 6/2005 | Keller | |
| 7,281,422 B2 | 10/2007 | Keller | |
| 7,334,486 B1 * | 2/2008 | Klammler | G01F 1/74 |
| | | | 73/861.07 |
| 7,753,120 B2 | 7/2010 | Keller | |
| 7,841,405 B2 | 11/2010 | Keller | |
| 7,896,578 B2 | 3/2011 | Keller | |
| 8,069,715 B2 | 12/2011 | Keller | |
| 8,176,977 B2 | 5/2012 | Keller | |
| 8,424,377 B2 | 4/2013 | Keller | |
| 9,008,971 B2 | 4/2015 | Keller | |
| 9,534,477 B2 | 1/2017 | Keller | |
| 9,797,227 B2 | 10/2017 | Keller | |
| 10,030,486 B1 | 7/2018 | Keller | |
| 10,060,252 B1 * | 8/2018 | Keller | E21B 47/11 |
| 10,139,262 B2 | 11/2018 | Keller | |
| 10,337,314 B2 | 7/2019 | Keller | |
| 10,472,931 B1 | 11/2019 | Keller | |
| 11,319,783 B1 | 5/2022 | Keller | |
| 2009/0003934 A1 * | 1/2009 | Keller | F16L 55/1651 |
| | | | 166/264 |
| 2012/0173148 A1 | 7/2012 | Keller | |
| 2020/0232292 A1 * | 7/2020 | Keller | E21B 43/105 |

OTHER PUBLICATIONS

Cherry, J.A., et al.; "A New Depth-Discrete Multilevel Monitoring Approach for Fractured Rock"; Ground Water Monitoring & Remediation; 2007; pp. 57-70; vol. 27, No. 2; USA.

* cited by examiner

METHOD FOR REMOVING NAPL CONTAMINANTS FROM GEOLOGIC FORMATIONS

CROSS-REFERENCE TO RELATED APPLICATIONS

This application claims the benefit of the filing of U.S. Provisional Patent App. Ser. No. 63/156,447 entitled "Method for Removing NAPL Contaminants from Geologic Formations" filed on 4 Mar. 2021, and the specification thereof is incorporated herein by reference.

BACKGROUND OF THE INVENTION

Field of the Invention

This invention relates generally to methods for remediating subsurface contamination, and more specifically to a method for removing non-aqueous phase liquids (NAPL) from geologic media below the surface of the ground.

Background Art

A "borehole" is a hole, e.g., a drilled shaft, into the Earth's subsurface. Various procedures may be accomplished in boreholes by everting liners into boreholes. Liner compositions, and installation of borehole liners, are known in the art, e.g., U.S. Pat. Nos. 7,896,578, 6,910,374, and 6,283,209, which are incorporated here by reference. The hydraulic conductivity profiling techniques described in this applicant's U.S. Pat. Nos. 6,910,374 and 7,281,422 have been used to map flow zones in over 300 boreholes since 2007. These patents, whose complete teachings are hereby incorporated by reference, describe the flexible liner installation by the eversion process. It also is known to map, upon contact, the presence of NAPL (non-aqueous phase liquids) in boreholes by producing a very visible stain of an outside covering on the everting liners described in the above patents. The stain patterns, coupled with the mapping of conductive geologic fractures as measured by the method of U.S. Pat. No. 7,896,578 (incorporated herein by reference), allow the identification of permeable fractures and porous layers, in Earth's subsurface, which contain NAPLs. Various NAPLs of particular interest as contaminants are, without limitation, trichloroethylene (TCE), perchloroethylene (PCE) and similar compounds, coal tar, creosote, and oils. NAPLs do not mix well with water and have relatively low solution coefficients.

A flexible liner has the advantage of sealing a borehole and isolating numerous devices one from another when the liner interior pressure exceeds the pressure or head of the fluids in the surrounding geologic formation (typically ground water). The cover of previous sampling uses contains a hydrophobic composition and typically is about 1 mil thick. Hence, the volume amount of NAPL absorbed by the cover is exceedingly small. It has been suggested that such NAPL absorption might be effective in removing NAPL from a formation, but the small volume absorbed in known monitoring type systems is not efficient. The contaminant-stained cover can be removed from the borehole by inversion of the liner, and another covering can be added; but the labor of removal and the small amount of NAPL extracted from the formation makes it entirely impractical as a NAPL-removal device. Thus, there is a previously unmet need for a method for removal of all available NAPL in the formation.

The method most commonly used in the art for removing contaminating NAPL from ground water is to pump the water from a contaminated aquifer and then to either pour the water through an evaporation tower to remove the NAPL by evaporation, for volatile contaminants, or to pass the water through an activated carbon bed to adsorb the dissolved NAPL. Because the solution limit of TCE (trichloroethylene) is 1000 mg/l, or less, one must pump more than a liter of water to remove one gram of TCE at its maximum concentration. More typical concentrations of concern are nearer the drinking water limit of 0.005 mg/l. At that solution low level and higher, far more water pumping (200,000 liters) is required to remove one gram of TCE. From a standpoint of efficiency, it is far better to remove the NAPL directly in its pure phase to reduce ground water contamination.

It is known to use absorptive materials to remove dissolved NAPL from water-filled boreholes, but only with nearly the same inefficiency limits of the "pump and treat" technique described above. A substantial problem with all such former methods is that the borehole must be open (unsealed), which can allow the NAPL to migrate further in the formation (as NAPL or in the dissolved phase). There are numerous publications describing how the pure NAPL migrates through a subsurface formation under gravity, because it has a density of 1.46 g/cc—heavier than water— and by the migration of the dissolved phase.

With the foregoing as background, the invention disclosed herein provides an improved means and method for removing NAPL from subterranean geologic media. The invention exploits the experience with reactive covers of everting liners to devise a more efficient method for removal of TCE, or like compounds, from contaminated geologic formations. The method according to the present disclosure addresses the removal of the NAPL pure liquid from the formation directly.

SUMMARY OF THE INVENTION

There is disclosed a method and apparatus to line a borehole with a highly absorbent material most conveniently emplaced on an everting flexible liner and removed by inverting the flexible liner. A flexible liner cover that has an extremely high absorptive capacity for NAPLs of several kinds, and which can withstand the eversion and removal process to recover the NAPL absorbed in the cover, is disclosed. An advantage over known methods is the ability of the flexible carrier liner to urge the absorbent cover to the borehole wall while also sealing the borehole against contaminant migration. The identification of a suitable absorbent material, for the liner cover, allows the method to compete well with alternative methods previously known.

Harnessing advantageously the know-how of applicant's previously patented methods, the locations of contaminated fractures (and their flow characteristics) are determined such that a better assessment of the efficacy of this invention can be performed. The combination of this system, deployed on a transparent liner and in association with a dye transfer technique, allows assessment with a common borehole camera of the efficiency of the system and method to determine how long to leave the absorber in place before removing it—with then a possible new covering on the liner for reinstallation to further the absorption process.

BRIEF DESCRIPTION OF THE DRAWINGS

The attached drawings, which form part of this disclosure, are as follows.

DETAILED DESCRIPTION OF THE INVENTION

Figure 1:
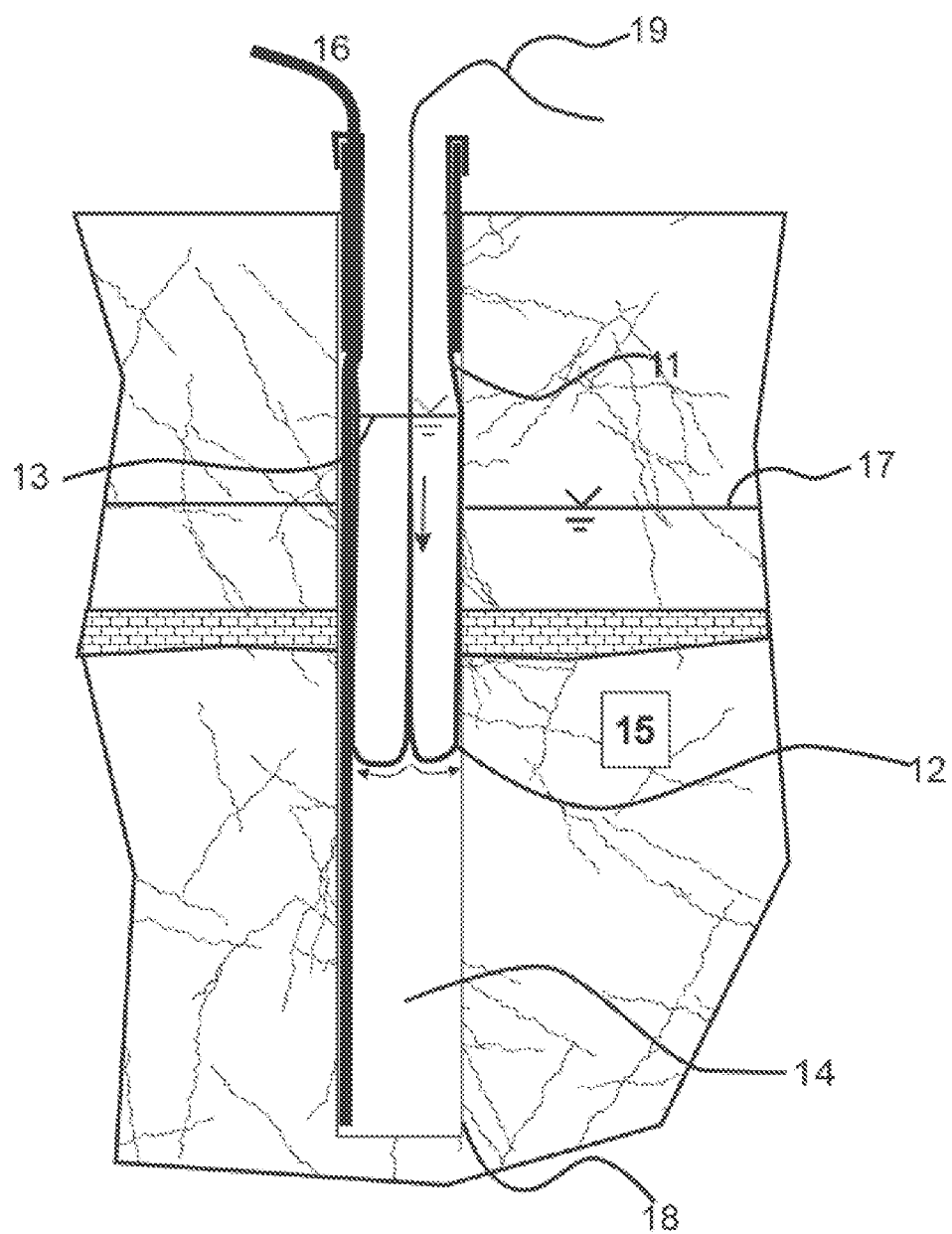
FIG. 1 is a side sectional view of an everting liner during emplacement in a borehole with an absorbent covering and the pump tube emplaced in the borehole, generally according to known principles.

A flexible liner installation is shown in FIG. 1. One embodiment of the system and method includes of a strong, flexible, liner 11 which is everted (turned "inside-out") against a borehole wall 12 by the higher pressure (head) within the flexible liner 11, because the water level 13 inside the liner is above the water table level 17 in the surrounding geologic formation 15. When installed in the borehole against the borehole wall 12, this pressurized liner 11 seals the borehole 14 against vertical fluid flow within the borehole 14 (i.e., up, or down, between the liner 11 and the borehole wall 12). Not shown in FIG. 1 is a liner outer cover being pressed to the borehole wall 12 as the covered liner 11 is everted, and during the continued eversion of the liner 11 at the location in the borehole.

It is useful to remove the ambient water from the volume of the borehole 14 beneath the liner 11 as the liner is being everted down the borehole. Otherwise, the contaminated ambient borehole water, in the volume beneath the everting liner, is driven by the descending liner 11 into available flow paths (e.g., fractures in the formation 15) thereby spreading the contamination. A common method of water removal is to use a pump tube 16 as seen in FIG. 1 for an ordinary procedure of air lift pumping. The pump tube 16 is installed in the borehole 14 before the liner 11 is everted down into the borehole 14, such that the pump tube 16 is situated between the liner 11 and the borehole wall 12. A tether 19 is attached to the bottom-most end of the liner 11, and is used to reverse the eversion installation, that is, by inverting the liner back up the borehole 14 by pulling upward on the tether.

Figure 2:
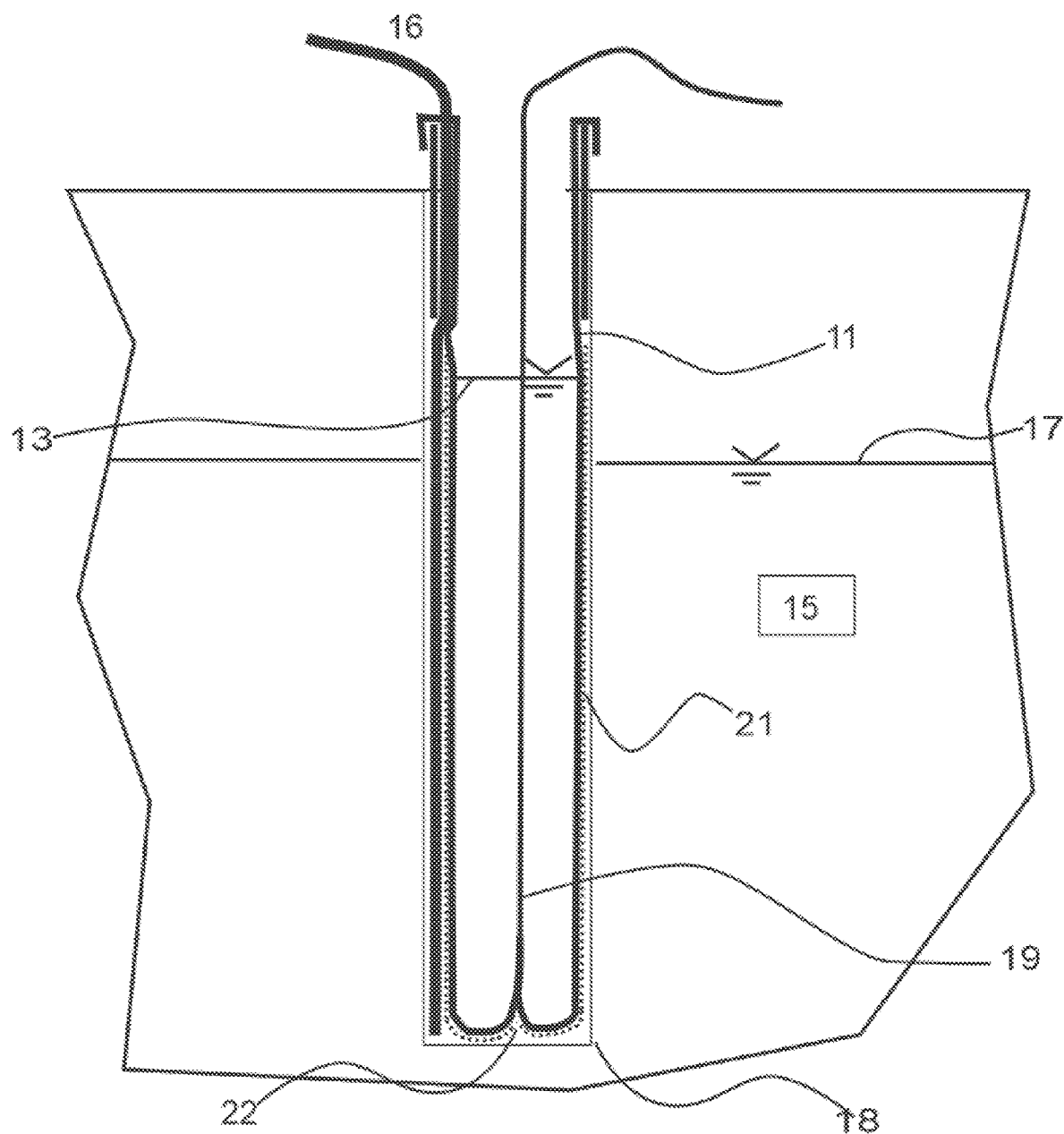
FIG. 2 is a diagrammatic side section view of a covering in place on the fully everted liner according to the present invention.

Attention is invited to FIG. 2, which illustrates the presence and use of an absorbent outer cover 21 which is disposed on the flexible liner 11 such as the liner of FIG. 1 prior to the liner 11 installation into the borehole 14. According to the present system and method, the liner 11 is preferably composed of a substantially transparent material which permits a liner covering, on the outside of the liner, to be viewable through the liner. Alternatively, only portion(s) of the flexible liner 11, such as annular segments thereof, or axial strips defining only arcuate portions of the liner's circumference, are composed of a transparent flexible material. The water level 13 in the liner 11 interior above the formation water table 17 provides the pressure urging and pressing the liner 11 and its covering 21 toward and against the formation 15 at the borehole wall 12. (The absorbent covering 21 accordingly is between the body of the liner 11 and the wall of the borehole 14.) As the liner 11 everts down the hole, the cover 21 is pressed against the borehole wall 12. The absorbent cover 21 preferably extends to the bottom-most end 22 of the fully everted liner 11 when the liner reaches the bottom of the borehole 18. The absorbent cover 21 preferably thus extends the full axial length of the liner 11, because NAPL (especially those of density greater than 1 gm/cc) often collect in the bottom 18 of the hole 14 prior to the liner 11 installation. The absorbent outer cover 21 present at and across the liner's bottom end 22 can absorb the NAPL accumulated in the volume beneath the liner 11 in the bottom 18 of the borehole.

Figure 3:
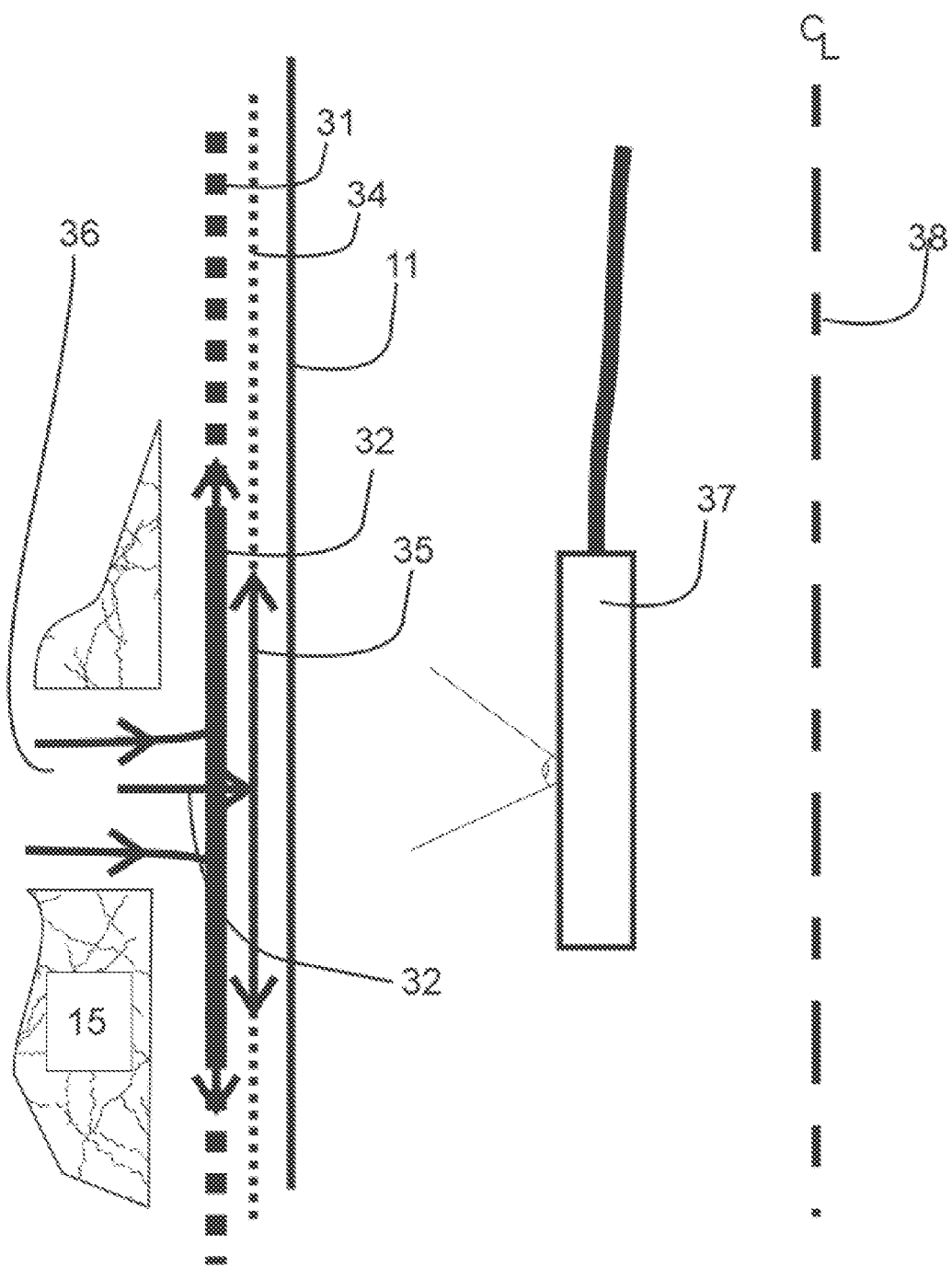
FIG. 3 is an enlarged side view of a system according to the present invention, showing the layered construction of the absorbent cover and the use of a camera to assess the amount of NAPL absorbed.

FIG. 3 is an enlarged view of a segment of the present liner system, showing the layered construction of the absorbent outer cover 21. The outer cover 21 preferably is composed of two layers. There is provided an absorbent outer layer 31 composed of a hydrophobic material that nevertheless is absorbent of NAPL, and an inner layer 34, also absorbent of NAPL. The outer layer 31 is seen to be adjacent or contacting the borehole wall defined by the geologic formation 15 when the liner is placed in the borehole. This preferred, standard, version of outer layer 31 has a conventional thickness known in the art which permits it to be everted during liner installation, and without eversion being impeded by the outer layer's buoyancy. The center line 38 in FIG. 3 is the relative center of the borehole 14, and effectively also defines the central axis of the installed tubular liner 11. Upon contact with the formation 15, the absorbent outer layer 31 aggressively absorbs NAPL 32 present in the ground water within any adjacent fracture 36 in the formation 15, yet absorbs little or no water because the outer layer 31 is hydrophobic. As the NAPL 32 saturates the outer layer 31, the inner layer 34 then wicks the excess NAPL 32 from the outer layer 31 as it saturates, and the NAPL is received in the inner layer 34. Consequently, the NAPL 32 penetrates the outer layer 31 and then passes into the inner layer 34. The inner layer 34 is composed of a thin (relative to the thickness of the outer layer 31) hydrophobic material, chemically reactive to NAPL, which material has been known and used in the industry for years to "map" NAPL in boreholes. The NAPL 32 which wicks into and permeates the inner layer 34 reacts chemically with the inner layer so to cause a bright stain 35 visible in the inner layer 34. The bright stain 35 in FIG. 3 of the inner layer 34 occurs because the outer surface of the inner layer 34 is dye striped. A transparent portion of the liner 11 is in locational alignment with the stain 35 in FIG. 3, and thus the stain is visible through the transparent portion.

The NAPL 32 upon contact with the inner layer 34 is aggressively absorbed by the inner hydrophobic layer 34. The dye is carried by the NAPL 32 (often a solvent such as TCE or PCE) to the innermost surface of the inner layer 34 (i.e., adjacent the outside of the body of liner 11). The stain 35 on the inside of the inner layer 34 is clearly visible through the liner 11 because of the transparent nature of the liner 11, as described in U.S. Pat. No. 10,060,252 (incorporated here by reference). Advantageously, the NAPL absorptive capacity of both the outer and the inner layers 31, 34 of the cover 21 is improved because the layers, being hydrophobic, absorb little water which would otherwise displace absorbed volumes of NAPL.

A camera 37 shown in FIG. 3 can be lowered down from the ground's surface, and within the interior volume of the liner 11. The camera can detect, through a transparent portion of the liner 11, any stain 35 on the inner surface of the inner layer 34. The view of the inner layer (visible through the liner) is transmissible via a camera cable extending to above the ground's surface, such that an operator may observe in real time the images captured by the camera 37. When a stain 35 in the inner layer 34 is observed, the observation indicates that the outer absorbent layer 31 has been saturated by NAPL at that location. As the NAPL 32 propagates in the outer layer 31, the interval of the cover 21 saturated with NAPL 32 expands in the outer layer 31. In response to growth of the NAPL-saturated area in the outer layer 31, the stain 35 in the inner layer 34 will likewise enlarge. Using the stain 35 as seen by the camera 37 as an indication of the range or degree of saturation of the outer layer 31, it can be determined when it is best to remove the liner 11 with the cover 21 (including dual layers 31, 34), to recover the NAPL 32 absorbed in the layer 31 and layer 34. Thus, the timing of the inversion of the liner 11 to the ground's surface, to remove NAPL-soaked cover 21, can be optimized. Depending on the thickness of the outer layer 31, the amount of the NAPL 32 absorbed can be as much as fifteen times the amount normally absorbed in an inner layer 34 of the cover, when such an inner liner is previously deployed according to known conventions as a single thin "detection" layer on the outside of a liner 11).

Figure 4:
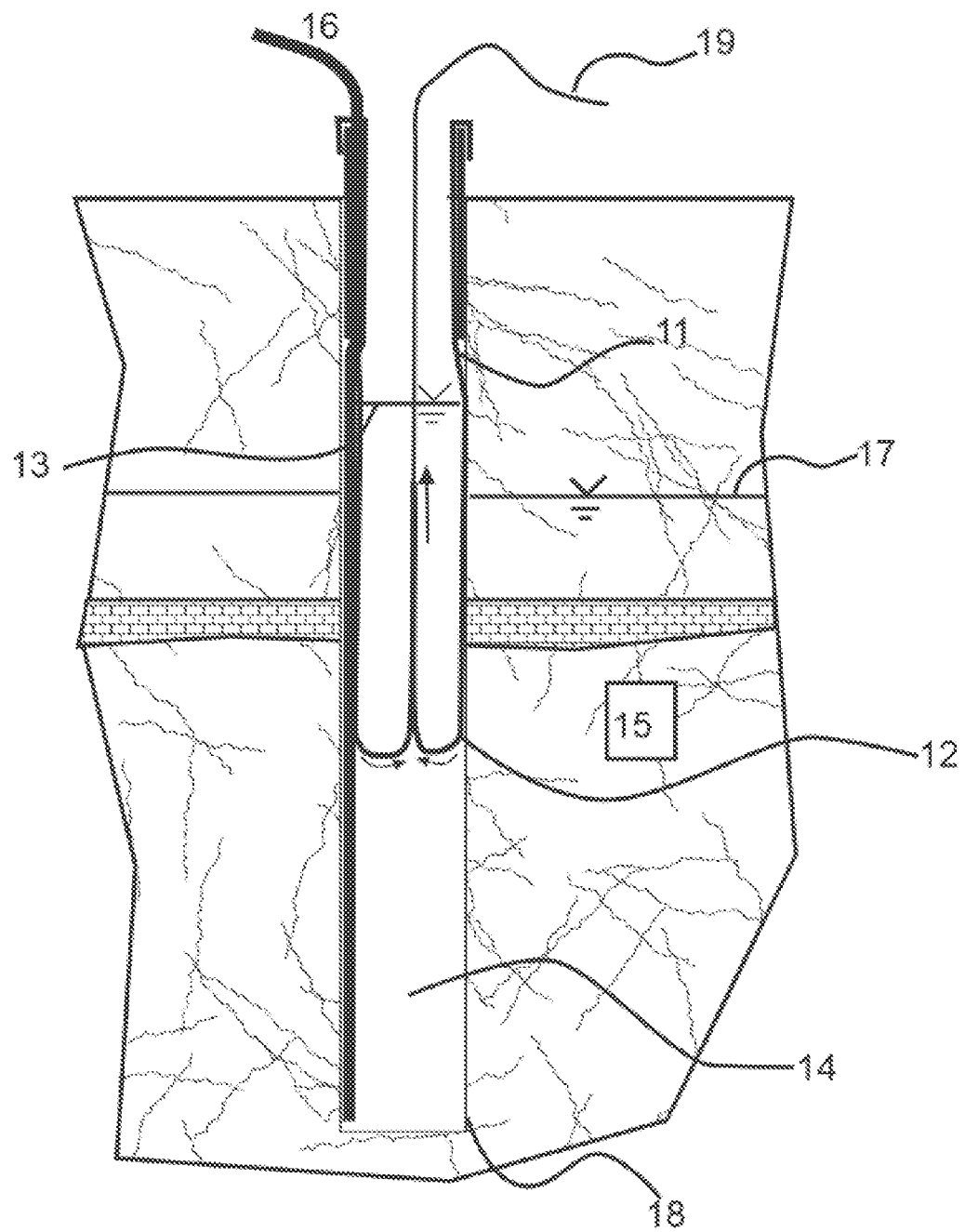
FIG. 4 is a side sectional view comparable to FIG. 1, but illustrating according to the present invention the removal of the inverting liner (with its absorbent covering) from the borehole.

FIG. 4 shows how the covered liner 11 is inverted to the surface to recover the NAPL entrained and absorbed in the multi-layer cover 21. The procedure is the reverse of the installation by eversion. Tension on the tether 19 (e.g., tether running up to a powered reel or spool on the surface above the borehole) causes the liner 11 to invert (turning "outside-in"), thereby carrying the composite cover 21 along with the liner 11. After its complete removal from the borehole 14, the liner outer cover 21 is now contained within the interior volume of the "inverted" liner 11. The liner 11 and its contained cover 21 (bearing absorbed NAPL therein) thus are retrieved from the borehole 14 and to the surface.

Figure 5:
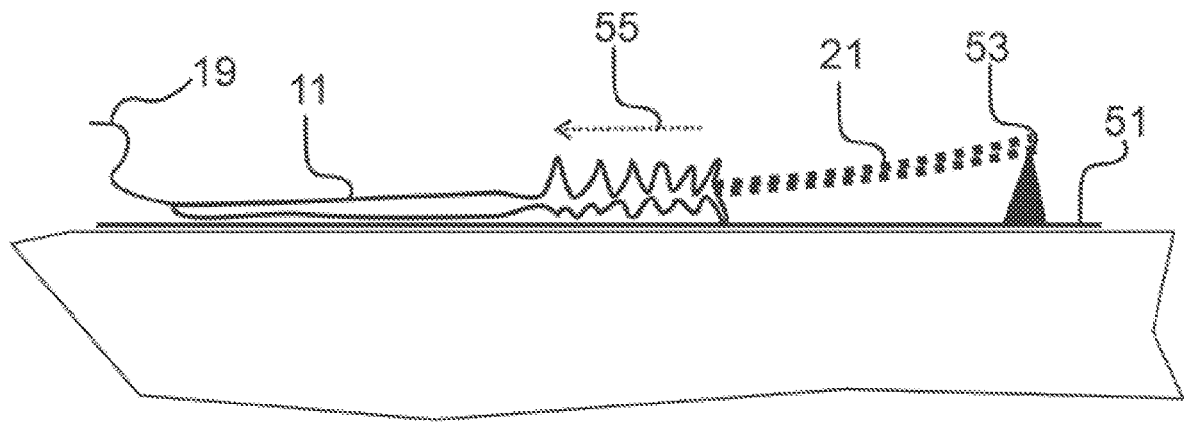
FIG. 5 is a diagrammatic side view of the present system, on the ground's surface, illustrating a method for removal of the absorbent covering from inside the inverted liner after its removal from the borehole.

Attention is advanced to FIG. 5, illustrating a process according to the present disclosure, undertaken on or above the surface of the ground, for removal of the multi-layer cover 21 (including the absorbed NAPL contaminants) from within the interior of the inverted liner 11. The ground's surface is protected from contamination, as with for example a large NAPL-impermeable plastic sheet placed and spread upon the ground. The inverted liner 11 is extended out and laid upon the protective plastic sheet 51 on the surface of the ground to prevent NAPL from contacting the ground's surface. The outer cover 21 is then anchored at its top end 53. The inverted liner 11, which initially surrounds the cover 21, is removed from off the inverted cover 21 by manually sliding the liner 11 toward the tether 19 end (the bottom end) of the liner 11, as indicated by the directional arrow 55 of FIG. 5. The sliding movement of the liner 11 is continued further toward the tether 19 (at the closed bottom end 22 of the liner) to further expose the cover 21. Finally, the liner 11 is slipped over the tether 19 (where it is attached to the liner) to expose the bottom end of the cover 21. The cover 21 is then cut or otherwise detached from the liner 11, and the cover 21 saturated with the recovered NAPL preferably is rolled up within the plastic sheeting 51 to be contained for lawful disposal.

Figure 6:
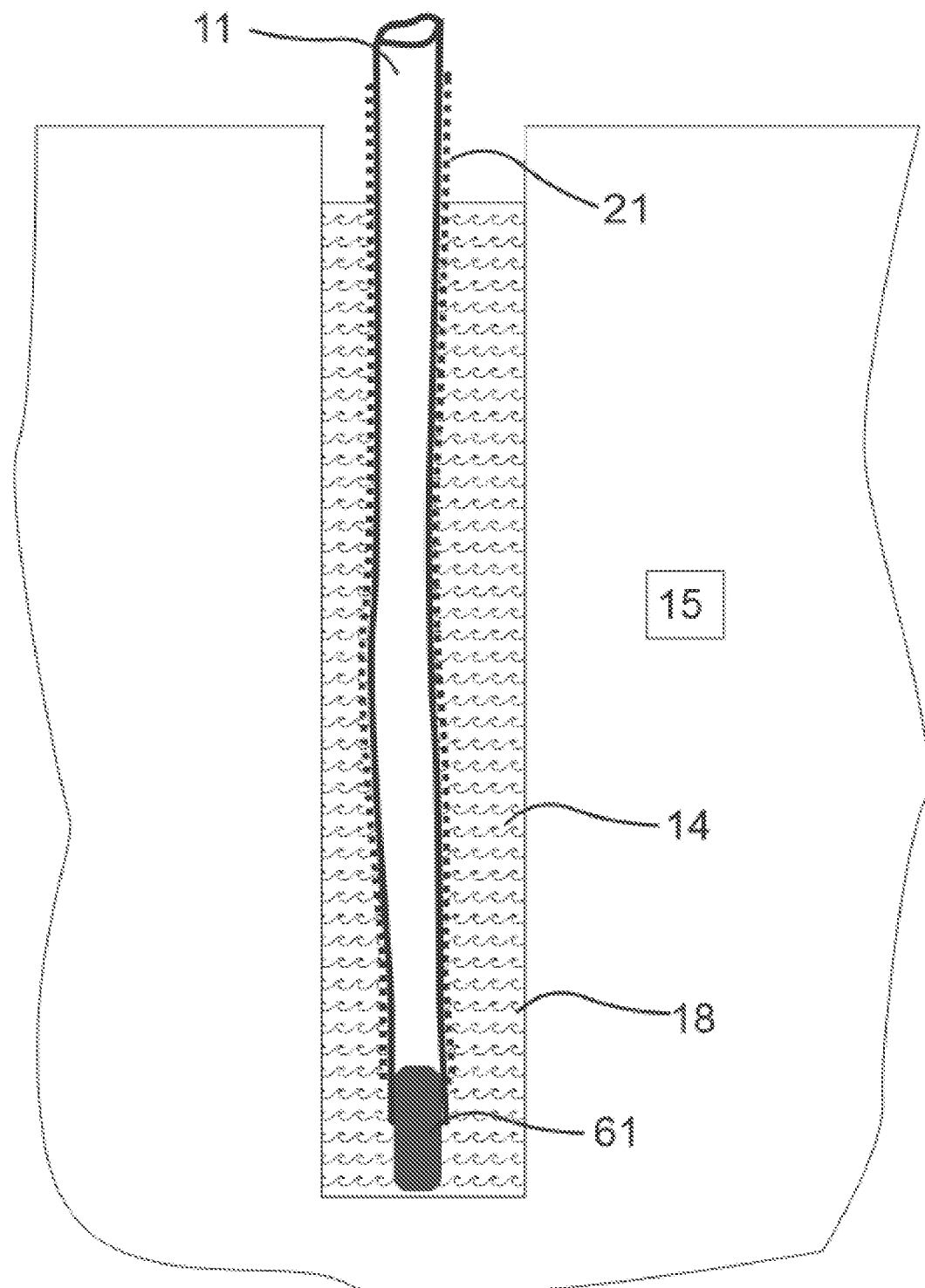
FIG. 6 is a side sectional view illustrating a side view of a system according to the present invention, having a weighted liner with an absorptive cover.

For an even greater volume of absorbed NAPL prior to liner removal, it may be desirable to employ an embodiment of absorbent outer layer 31 of greater thickness (that is, a "thick" absorbent layer 31 having a thickness exceeding that of the first or "standard" outer absorbent layer mentioned above). So doing, however, implicates the possibility that the dimensional thickness, and particularly the buoyancy, of this alternative thick absorbent layer may inhibit the eversion down the borehole of the liner 11 and the thinner inner layer 34. In such case, FIG. 6 shows how a liner 11 can be constructed with a covering 21 having the thick absorbent layer 31 and inner layer 34; such a liner 11 has a bottom end including a suitable weight 61. The weight 61 is provided in any appropriate form or manner known, such that the force of the weight 61 overcomes the buoyancy of the thick outer absorbent layer. The liner 11 so equipped can be lowered directly (i.e., not by eversion) into the borehole 14 and then dilated against the borehole wall 18 by filling the liner interior with water. The prior installation of a pump tube 16 (as shown in FIG. 1) allows the water in the borehole 14 to be removed as the liner 11 is dilated to urge the composite cover 21 against the borehole wall 18. The liner 11 removal in this alternative case can be done by pumping the water from the inside of liner 11, causing it to collapse, using an ordinary pump lowered into the liner. The liner 11 and cover 21 assembly is then lifted up from and out of the borehole 14 with the NAPL absorbed in the cover 21.

After the liner 11 has been lifted from the borehole 14, it is easily removed by slitting the composite cover 21 lengthwise, with a similar disposal as suggested previously. It is important to comply with applicable safety procedures when handling some toxic NAPLs.

This method is useful for a wide variety of NAPLs such as TCE, PCE, creosote, coal tar and some oils especially colored oils, plus other NAPLs. The oils (e.g., castor oil) are not so effective in providing a bright stain on the inner element of the composite cover unless they have a colored appearance. The stain may be more visible through the liner in UV light with the appropriate camera.

The absorbent covering 21 is intended to provide a means of extracting a significant volume of NAPL-like contaminants from formations containing ground water. The addition of the staining process and the camera view through the transparent liner allows an assessment of how long the system should be left in place against the borehole wall before it becomes saturated. The liner compression of the high capacity absorbent cover against the hole wall, and the simultaneous seal of the borehole, are unique to the industry of remediation of NAPL contaminated ground water methods. Thus, the combination and method described herein is an advance in the art, and the newly enabled method provides a special advantage to the industry not previously in use. The actual utility of the absorber material tested is a revealing advantage not before realized.

The method for removing non-aqueous phase liquids (NAPL) from the geologic formation 15 below a surface of the ground is apparent from the foregoing, but may be further explicated. The method includes attaching an outer cover 21 on a tubular flexible liner 11, composing the outer cover 21 with an absorbent outer layer 31 and an inner layer 34 between the flexible liner 11 and the outer layer, the outer layer and inner layer both absorbent of NAPL, placing the flexible liner 11 and outer cover 21 down a borehole 14 surrounded by the geologic formation 15, pressing the absorbent outer layer 31 (as by, e.g., pressurizing the liner interior with a fluid) toward a wall 12 of the borehole 14, permitting the absorbent outer layer 31 to absorb NAPL present in any ground water within an adjacent fracture 36 in the geologic formation 15, wicking NAPL from the absorbent outer layer 31 into the inner layer 34, and then removing the flexible liner and outer cover (with any NAPL absorbed in its outer or inner layers 31, 34) from the borehole 11 (i.e., to the surface of the ground).

The preferred version of the method further comprises the step of composing both the absorbent outer layer 31 and the inner layer 34 of a hydrophobic material. Also, the method may include the step of fabricating at least a portion of the flexible liner of a transparent material.

The method optionally includes the steps of composing the inner layer 34 of a material chemically reactive to NAPL to generate a visible stain 35 in the chemically reactive material, allowing any NAPL wicked into the inner layer 34 to react with the inner layer, thereby causing a stain 35 in an inner surface of the inner layer, lowering a camera 37 within an interior volume of the flexible liner 11, detecting with the camera, through the transparent material portion of the flexible liner, any stain on the inner surface of the inner layer, and observing with the camera a degree of NAPL saturation in the inner layer 34. By these immediately foregoing steps, the method may further include the step determining a time to remove the flexible liner 11 from the borehole.

Placing the flexible liner 11 and outer cover 21 down a borehole 14 preferably includes everting the flexible liner and outer cover down the hole. In such a process, the step of removing the flexible liner 11 and the outer cover 21 from the borehole 14 will involve inverting the flexible liner and outer cover from within the borehole. The method may then further include the steps of protecting the surface of the ground with a plastic sheet 51, extending the flexible liner 11 and outer cover 21 upon the plastic sheet, anchoring the outer cover at a top end 53 thereof, removing the flexible liner from the outer cover by manually sliding the flexible liner along the outer cover and toward a bottom end 22 of the flexible liner, exposing a bottom end of the outer cover 21, and then detaching the outer cover from the flexible liner. These foregoing steps may be followed by rolling the outer cover 21, with NAPL absorbed therein, within the plastic sheet 51.

The method optionally includes composing the outer cover 21 with an absorbent outer layer 31 that is a thick absorbent outer layer. In such a version of the method, the step of placing the flexible liner 11 and outer cover down 21 a borehole 14 may include the step of weighting a bottom end 22 of the flexible liner (as with a metal slug or with mud 61), and lowering it down the borehole without everting the flexible liner and outer cover. In this version of the method, removing the flexible liner 11 and outer cover 21 from the borehole 14 comprises lifting the flexible liner and outer cover without inverting them.

Although the invention has been described in detail with particular reference to these preferred embodiments, other embodiments may achieve the same results. In the previous description, specific details are set forth, such as specific materials, structures, chemicals, processes, etc., in order to provide a thorough understanding of the present invention. However, as one having ordinary skill in the art would recognize, the present invention can be practiced without resorting to the details specifically set forth. In other instances, well known principles of mechanics and physics have not been described in detail, in order not to unnecessarily obscure the present invention.

Only some embodiments of the invention and but a few examples of its versatility are described in the present disclosure. It is understood that the invention is capable of use in various other combinations and is capable of changes or modifications within the scope of the inventive concept as expressed herein. Modifications of the invention will be obvious to those skilled in the art and it is intended to cover with the appended claims all such modifications and equivalents. All the patents cited hereinabove are hereby incorporated herein by reference.

What is claimed is:

1. A method for removing non-aqueous phase liquids (NAPL) from geologic formation below a surface of the ground, comprising:
    attaching an outer cover on a tubular flexible liner;
    composing the outer cover with an absorbent outer layer and an inner layer between the flexible liner and the absorbent outer layer, the absorbent outer layer and inner layer both absorbent of NAPL;
    placing the flexible liner and outer cover down a borehole surrounded by the geologic formation;
    pressing the absorbent outer layer toward a wall of the borehole;
    permitting the absorbent outer layer to absorb NAPL present in any ground water within an adjacent fracture in the geologic formation; and
    wicking NAPL from the absorbent outer layer into the inner layer.

2. The method according to claim 1 wherein placing the flexible liner and outer cover down the borehole comprises everting the flexible liner and outer cover, and further comprising composing both the absorbent outer layer and the inner layer of a hydrophobic material.

3. The method according to claim 2 further comprising fabricating at least a portion of the flexible liner of a transparent material.

4. The method according to claim 3 further comprising the steps of:
    composing the inner layer of a material visibly chemically reactive to NAPL;
    allowing any NAPL wicked into the inner layer to react with the inner layer, thereby causing a visible stain in an inner surface of the inner layer;
    lowering from the ground's surface a camera within an interior of the flexible liner;
    detecting with the camera, through the transparent material portion of the flexible liner, any stain on the inner surface of the inner layer resulting from a reaction of NAPL with the material that is chemically reactive to NAPL;
    observing with the camera a degree of NAPL saturation in the inner layer.

5. The method according to claim 4 further comprising determining a time to remove the flexible liner from the borehole, and then removing the flexible liner and outer cover from the borehole.

6. The method according to claim 2 wherein the step of removing the flexible liner and outer cover from the borehole comprises inverting the flexible liner and outer cover, and further comprising:
    protecting the surface of the ground with a plastic sheet;
    extending the flexible liner and outer cover upon the plastic sheet;
    anchoring the outer cover;
    removing the flexible liner from the outer cover by manually sliding the flexible liner along the outer cover and toward a bottom end of the flexible liner;
    exposing a bottom end of the outer cover; and
    detaching the outer cover from the flexible liner.

7. The method according to claim 6 further comprising rolling the outer cover, with absorbed NAPL, within the plastic sheet.

8. The method according to claim 1 wherein composing the outer cover with the absorbent outer layer comprises composing the outer cover with the absorbent outer layer thicker than the inner layer.

9. The method according to claim 8 wherein placing the flexible liner and outer cover down a borehole comprises weighting a bottom end of the flexible liner and lowering it down the borehole without everting the flexible liner and outer cover.

10. The method of claim 9 wherein removing the flexible liner and outer cover from the borehole comprises lifting the flexible liner and outer cover without inverting them.

11. A method for removing non-aqueous phase liquids (NAPL) from geologic formation below a surface of the ground, comprising:
  attaching an outer cover on a tubular flexible liner;
  composing the outer cover with an absorbent outer layer and an inner layer between the flexible liner and the absorbent outer layer, the absorbent outer layer and inner layer both absorbent of NAPL;
  placing the flexible liner and outer cover down a borehole surrounded by the geologic formation by everting the flexible liner and outer cover;
  pressing the absorbent outer layer toward a wall of the borehole;
  permitting the absorbent outer layer to absorb NAPL present in any ground water within an adjacent fracture in the geologic formation;
  wicking NAPL from the absorbent outer layer into the inner layer; and
  removing the flexible liner and outer cover from the borehole by:
    inverting the flexible liner and outer cover;
    protecting the surface of the ground with a plastic sheet;
    extending the flexible liner and outer cover upon the plastic sheet;
    anchoring the outer cover;
    removing the flexible liner from the outer cover by manually sliding the flexible liner along the outer cover and toward a bottom end of the flexible liner;
    exposing a bottom end of the outer cover; and
    detaching the outer cover from the flexible liner.

12. The method according to claim 11 further comprising composing both the absorbent outer layer and the inner layer of a hydrophobic material.

13. The method according to claim 11 further comprising fabricating at least a portion of the flexible liner of a transparent material.

14. The method according to claim 13 further comprising, before the step of removing the flexible liner and outer cover from the borehole, the steps of:
  composing the inner layer of a material visibly chemically reactive to NAPL;
  allowing any NAPL wicked into the inner layer to react with the inner layer, thereby causing a visible stain in an inner surface of the inner layer;
  lowering from the ground's surface a camera within an interior of the flexible liner;
  detecting with the camera, through the transparent material portion of the flexible liner, any stain on the inner surface of the inner layer resulting from a reaction of NAPL with the material that is chemically reactive to NAPL;
  observing with the camera a degree of NAPL saturation in the inner layer.

15. The method according to claim 14 further comprising determining, from the degree of NAPL saturation in the inner liner, a time to remove the flexible liner from the borehole.

16. The method according to claim 11 further comprising rolling the outer cover, with absorbed NAPL, within the plastic sheet.

17. The method according to claim 11 wherein composing the outer cover with the absorbent outer layer comprises composing the outer cover with the absorbent outer layer thicker than the inner layer.

18. A method for removing non-aqueous phase liquids (NAPL) from geologic formation below a surface of the ground, comprising:
  attaching an outer cover on a flexible liner;
  fabricating at least a portion of the flexible liner of a transparent material;
  composing the outer cover with an absorbent outer layer and an inner layer between the flexible liner and the absorbent outer layer, the absorbent outer layer and inner layer both absorbent of NAPL;
  composing the inner layer of a material visibly chemically reactive to NAPL;
  everting the flexible liner and outer cover down a borehole surrounded by the geologic formation;
  pressing the absorbent outer layer toward a wall of the borehole;
  permitting the absorbent outer layer to absorb NAPL present in any ground water within an adjacent fracture in the geologic formation;
  wicking NAPL from the absorbent outer layer into the inner layer;
  allowing any NAPL wicked into the inner layer to react with the inner layer's material visibly chemically reactive to NAPL, thereby causing a visible stain in an inner surface of the inner layer;
  lowering from the ground's surface a camera within an interior of the flexible liner;
  detecting with the camera, through the transparent material portion of the flexible liner, any stain on the inner surface of the inner layer resulting from a reaction of NAPL with the material that is chemically reactive to NAPL;
  observing with the camera a degree of NAPL saturation in the inner layer;
  determining, from the degree of NAPL saturation in the inner liner, a time to remove the flexible liner from the borehole.

* * * * *